United States Patent Office 3,606,582
Patented Sept. 20, 1971

3,606,582
SORBENT FOR VACUUM PUMP AND METHOD FOR THE UTILIZATION OF SAID SORBENT
Francois Prevot, Antony; and Zbigniew Sledziewski, Cachan, France, assignors to Commissariat a l'Energie Atomique, Service du Developpement Industriel, Paris, France
No Drawing. Filed Sept. 18, 1969, Ser. No. 859,171
Claims priority, application France, Sept. 25, 1968, 167,483
Int. Cl. C09c *1/36;* F04b *37/02;* H01j *7/18*
U.S. Cl. 417—48                                    5 Claims

ABSTRACT OF THE DISCLOSURE

Titanium monoxide is employed as novel getter material for capturing and retaining gases by means of a sorption pump. Compared with titanium, the novel material possesses an appreciably higher absorption capacity at all temperatures below $-120°$ C. and especially below $-195°$ C., displays lower selectivity for gases, is capable of absorbing the rare gases and exhibits a high probability of capture of rare gas molecules.

---

This invention relates to a novel sorbent for vacuum pumps as well as to a method for the production of ultra-high vacuum which calls for the use of said sorbent and to the vacuum pumps employed for carrying out said method.

It is known that sorbents, also referred to as getters, are substances employed for producing a high vacuum within a sealed vessel.

Sorbent materials are mostly provided in the form of a filament which is heated by Joule effect; this filament is vaporized and condensed on the walls of the vessel. Gases such as oxygen, nitrogen and hydrogen combine with the sorbent film which has thus been deposited so as to form stable solids.

The most important properties of sorbent pumps (variously known as getter-ion pumps or sorption pumps) and of the sorbent materials themselves are:

Activity, capacity, selectivity, ultimate pressure.

Activity may be defined as the probability of retention of a molecule of gas to be absorbed at each impact on the active surface of the sorbent which covers the vessel walls; a number equal at a maximum to 1 unit is used as a measurement of this property.

Capacity is the total quantity of gas absorbed when the sorbent layer or "film" is saturated, that is to say when its activity has fallen to zero value.

The selectivity of a sorbent corresponds to the discrimination between those gases which said sorbent is capable of pumping and those which it is not capable of pumping; a sorbent is therefore all the more advantageous for pumping purposes as it is less selective.

Finally, the ultimate pressure is the lowest pressure which it is possible to produce by means of a sorbent in a vacuum pump.

A number of different substances have been employed as sorbents up to the present time, notably tantalum, zirconium, barium, and above all titanium which is particularly advantageous by reason of its high activity and because the compounds formed by titanium with gases are very stable solids.

Titanium which is employed as sorbent exhibits an activity which is correspondingly greater as the temperature of the walls of the pump housing is lower. Thus, at the temperature of liquid nitrogen ($-195°$ C.), the activity attains the ultimate value of one unit in the case of the usual gases; the capacity of titanium in the case of cold walls can attain $5 \times 10^{15}$ mol/cm.$^2$; titanium makes it possible to pump a fairly large number of gases but nevertheless exhibits fairly marked selectivity since it does not pump the rare gases (A, He, Kr, Ne, Xe); finally, the ultimate pressure which it has been possible to measure in titanium-film pumps in the case of cold surfaces is below $10^{-10}$ mm. of mercury, which is the value commonly obtained.

The present Applicant has found that, surprisingly, titanium monoxide (TiO) exhibits properties which are even superior to those of titanium in the field of vacuum pumps.

More particularly, the present invention is concerned with a sorbent consisting of titanium monoxide; the invention is also directed to a method of production of ultra-high vacuum in a sorbent pump (or getter-ion pump) wherein titanium monoxide is essentially employed as sorbent, as well as to the vacuum pumps for the practical application of said method.

A number of different properties and advantages of the present invention will be brought out by the examples which are given hereinafter by way of explanation but without any implied limitation.

The tests carried out in a vacuum pump in which titanium monoxide used as sorbent was placed in a crucible have served to demonstrate that the activity exhibited by titanium monoxide in respect of the usual gases pumped by titanium is not superior to the activity of titanium even at low temperatures but that, on the other hand, the capacity of titanium monoxide or total quantity of gas absorbed at saturation is between ten and thirty times that of titanium at the temperature of liquid nitrogen ($-195°$ C.); the superiority of titanium monoxide over titanium so far as capacity is concerned is less marked at temperatures above $-195°$ C. but nevertheless remains of interest as long as the temperature of the walls of the sealed vessel is lower than $-120°$ C. This gain in capacity is of great practical importance since it is essentially the low value of capacity of conventional sorbent pumps which limits the use of these latter.

Moreover, the titanium monoxide film which is deposited on the walls of the vessel has the advantage of possessing lower selectivity than a titanium film deposited under the same conditions. A particularly noteworthy fact is that, whereas titanium cannot absorb the rare gases, the titanium monoxide film is not only capable of taking up the rare gases but has a very appreciable specific activity with respect to these latter.

Finally, the ultimate pressure as measured on cold walls in vacuum pumps provided with a titanium monoxide deposit has proved to be comparable with the ultimate pressure attained by a titanium film under the same conditions.

The method in accordance with the present invention is of great value in the production of ultra-high vacuum or of any medium degree of molecular vacuum and does not give rise to contamination.

What we claim is:

1. A method of producing an ultra-high vacuum in a sorbent pump or getter ion-pump, said method consisting essentially of placing titanium monoxide in a sorbent pump and lowering the temperature of the walls of said pump down to at least $-120°$ C.

2. The method of claim 1, wherein the temperature of the walls of said pump is lowered down to at least $-195°$ C.

3. The method of claim 1, wherein the titanium mon-

3 oxide is placed in a receptacle disposed in the sorbent pump.

4. The method of claim 1, wherein a titanium monoxide film is deposited on the walls of the pump.

5. A method of producing an ultra-high vacuum in a sorbent pump or getter ion-pump which is capable of absorbing rare gases which comprises depositing a titanium monoxide sorptive film on the walls of the pump as a degassing agent and lowering the temperature of the walls of said pump down to at least $-195°$ C. to pre-chill the sorption material.

4

References Cited

UNITED STATES PATENTS

| 3,172,745 | 3/1965 | Needham et al. | 417—48 |
| 3,187,885 | 6/1965 | Hansen et al. | 417—48 |

ROBERT M. WALKER, Primary Examiner

U.S. Cl. X.R.

106—259; 252—181.6